(12) United States Patent
Nitschke et al.

(10) Patent No.: US 6,901,321 B1
(45) Date of Patent: May 31, 2005

(54) DEVICE FOR CONTROLLING RESTRAINT DEVICES IN AN AUTOMOBILE USING SIMILARLY CONSTRUCTED DATA PROCESSING UNITS

(75) Inventors: Werner Nitschke, Ditzingen (DE); Otto Karl, Leonberg (DE); Joachim Bauer, Oberstenfeld-Prevorst (DE); Michael Bischoff, Adelschlag (DE); Günter Fendt, Schrobenhausen (DE); Johannes Rinkens, Ingolstadt (DE); Stefan Schäffer, Schrobenhausen (DE); Richard Baur, Pfaffenhofen (DE)

(73) Assignees: Robert Bosch GmbH, Stuttgart (DE); Temic Telefunken Microelectronik, Heilbronn (DE)

( * ) Notice: Subject to any disclaimer, the term of this patent is extended or adjusted under 35 U.S.C. 154(b) by 229 days.

(21) Appl. No.: 09/647,296

(22) PCT Filed: Mar. 18, 1999

(86) PCT No.: PCT/DE99/00756

§ 371 (c)(1),
(2), (4) Date: Dec. 14, 2000

(87) PCT Pub. No.: WO99/50104

PCT Pub. Date: Oct. 7, 1999

(30) Foreign Application Priority Data

Mar. 28, 1998 (DE) ......................................... 198 13 943

(51) Int. Cl.⁷ ............................................. G06F 19/00
(52) U.S. Cl. .................. 701/45; 280/730.2; 280/728 R; 180/274; 180/282; 340/514; 340/310.01; 340/428

(58) Field of Search .............................. 701/45, 46, 49; 280/730.2, 728 R, 730 R, 730–736, 729, 742, 743, 772; 180/282, 274, 271, 82 C; 340/310.01, 428, 514, 45 B, 505, 52 E, 436, 429; 307/105 B, 10.1; 364/424.045, 424.055, 424.056; 370/471, 447, 389, 394, 474

(56) References Cited

U.S. PATENT DOCUMENTS 3,912,939 A * 10/1975 Quantz et al. .......... 307/10 SB
4,243,248 A * 1/1981 Scholz et al. ............... 280/735

(Continued)

FOREIGN PATENT DOCUMENTS

DE 195 19 130 12/1996
EP 0653337 A2 * 5/1995
EP 0 813 321 12/1997

OTHER PUBLICATIONS

SAE Technical paper: Bus System for Wiring Actuators of Restraint Systems. Feb. 24, 1997.*
Bauer et al., *Bussystem zur Vernetzung von Aktuatoren für Rückhaltesysteme* (Bus System for the Connection of Actuators for Restraint Systems), Conference Proceedings of the SAE International Congress & Exposition, Feb. 24–27, 1997, Detroit**.

*Primary Examiner*—Thomas G. Black
*Assistant Examiner*—Ronnie Mancho
(74) *Attorney, Agent, or Firm*—Kenyon & Kenyon

(57) ABSTRACT

A device which guarantees reliable real-time operation of the restraint system and offers each occupant of the vehicle individually the greatest possible protection includes the fact that data processing units are provided, all having the same design and each being capable of controlling multiple restraint devices and can decide independently of other data processing units whether the restraint devices assigned to it are to be deployed.

10 Claims, 1 Drawing Sheet

U.S. PATENT DOCUMENTS

| | | | | |
|---|---|---|---|---|
| 5,411,289 A | * | 5/1995 | Smith et al. | 280/735 |
| 5,482,314 A | * | 1/1996 | Corrado et al. | 280/735 |
| 5,606,556 A | | 2/1997 | Kawanishi et al. | 370/471 |
| 5,610,575 A | * | 3/1997 | Gioutsos | 340/429 |
| 5,745,027 A | * | 4/1998 | Malville | 340/310.01 |
| 5,758,899 A | * | 6/1998 | Foo et al. | 280/730.2 |
| 5,815,393 A | * | 9/1998 | Chae | 364/424.056 |
| 5,835,007 A | * | 11/1998 | Kosiak | 340/436 |
| 5,857,699 A | * | 1/1999 | Rink et al. | 280/737 |
| 6,037,860 A | * | 3/2000 | Zander et al. | 340/436 |

* cited by examiner

DEVICE FOR CONTROLLING RESTRAINT DEVICES IN AN AUTOMOBILE USING SIMILARLY CONSTRUCTED DATA PROCESSING UNITS

FIELD OF THE INVENTION

The present invention relates to a device for controlling restraint devices in a motor vehicle.

BACKGROUND OF THE INVENTION

The efficiency of the restraint systems in vehicles will increase greatly in the future to further improve the protection of passengers in the vehicle. This means that the number of restraint devices and their respective deployment device in the vehicle will increase drastically. These restraint devices will then include, for example, airbags for the driver and front passenger, optionally deploying in multiple stages, knee bags for the driver and front passenger, side airbags for the driver, front passenger and rear passengers, with side airbags possibly being provided for the head area as well as the chest area, seat belt tensioners which may also be activated in multiple stages, possibly also rollover bars, etc. Thus, a complex safety system composed of multiple restraint devices will be installed in the vehicle for each occupant of the vehicle.

A complex restraint system is described in the article "Bussystem zur Vernetzung von Aktuatoren für Rückhaltesysteme" by J. Bauer, G. Mehler and W. Nitschke in the *Conference Proceedings of the SAE International Congress & Exposition*, Feb. 24–27, 1997 Detroit. Bulky wiring harnesses have been eliminated by the introduction of a bus system which networks all the restraint devices. With this known system, each restraint device has its own data processing unit having essentially a processing unit, data input and output circuits, a memory unit, a time and clock base and a power supply. This data processing unit, which is also referred to as a peripheral intelligent ignition power module, is arranged in immediate proximity to the deployment device belonging to the respective restraint device, namely in an ignitor cap or on a substrate of the ignitor itself.

From a central control unit, each data processing unit receives its power supply over a bus line. In addition, the central control unit determines on the basis of multiple sensor signals—e.g., acceleration sensors, precrash sensors, seat occupancy sensors—which restraint devices are to be deployed. Accordingly, the central control unit addresses the respective data processing units with the help of a protocol transmitted over the bus line. Diagnostic requests also go out over the bus line from the central control unit to the individual data processing units which send their diagnostic responses back to the central control unit over the bus line.

Due to the fact that all the data processing units are designed similarly, this yields a great flexibility in the design of the restraint system for different equipment variants.

The greater the number of data processing units networked over the bus and controlled by the central control unit, the more problematical is the implementation of real-time operation.

A similar restraint system, where the control of each restraint component (e.g., airbags, seat belt tensioners) is provided by a processor assigned to it, is known from German Published Patent Application No. 195 19 130. The processor assigned to each restraint component deploys that restraint component only when this processor receives a deployment command from a central electronic unit. Such a deployment command is generated by the central electronic unit as a function of crash sensor signals. The optimum reaction mode for the respective restraint component is calculated by the respective processor from signals from the seat position sensors, child seat detection sensors, seat occupancy sensors and seat belt sensors.

SUMMARY OF THE INVENTION

An object of the present invention is to provide a device which will guarantee reliable real-time operation of the restraint system and offer each occupant of the vehicle individually the greatest possible protection in a wide variety of accident situations.

This object is achieved by the fact that each data processing unit decides independently of other data processing units whether one or more restraint devices assigned to it are to be deployed.

The device according to the present invention having data processing units which can autonomously cause the restraint devices assigned to them to be deployed guarantees more reliable real-time operation than the system according to the related art, where there is strictly central control of the individual data processing units.

Since a data processing unit according to the present invention can control a plurality of restraint devices, a complete, autonomously functioning restraint system specific to each occupant of a vehicle can be implemented with such a data processing unit. Thus, the individual protection of the occupants of a vehicle can be adapted better to the respective accident situation and severity.

Due to the fact that all the data processing units have a similar design, i.e., they have the same hardware structure, completely different equipment options of the restraint system can be implemented at low cost, because each data processing unit can be assigned to each restraint device or each combination of multiple restraint devices. The system thus has a great flexibility.

With respect to advantageous refinements of the present invention, either all the data processing units provided in the vehicle can be connected over a single bus line or groups of data processing units can be connected over separate bus lines to one or more central control units which control individual functions of the data processing units. The bus lines may be, for example, ring lines or spur lines. For example, the central control unit(s) may transmit signals to the data processing units over the bus line for the power supply and/or synchronization signals for the time and clock base and/or control signals for a circuit breaker by means of which the respective data processing unit can connect or disconnect the bus line and/or control signals for initiating a diagnostic procedure of the deployment elements and/or a stop signal that suppresses deployment of the restraint devices. It is expedient for the central control unit(s) to have the same structure as the data processing units.

DETAILED DESCRIPTION

Figure 1:
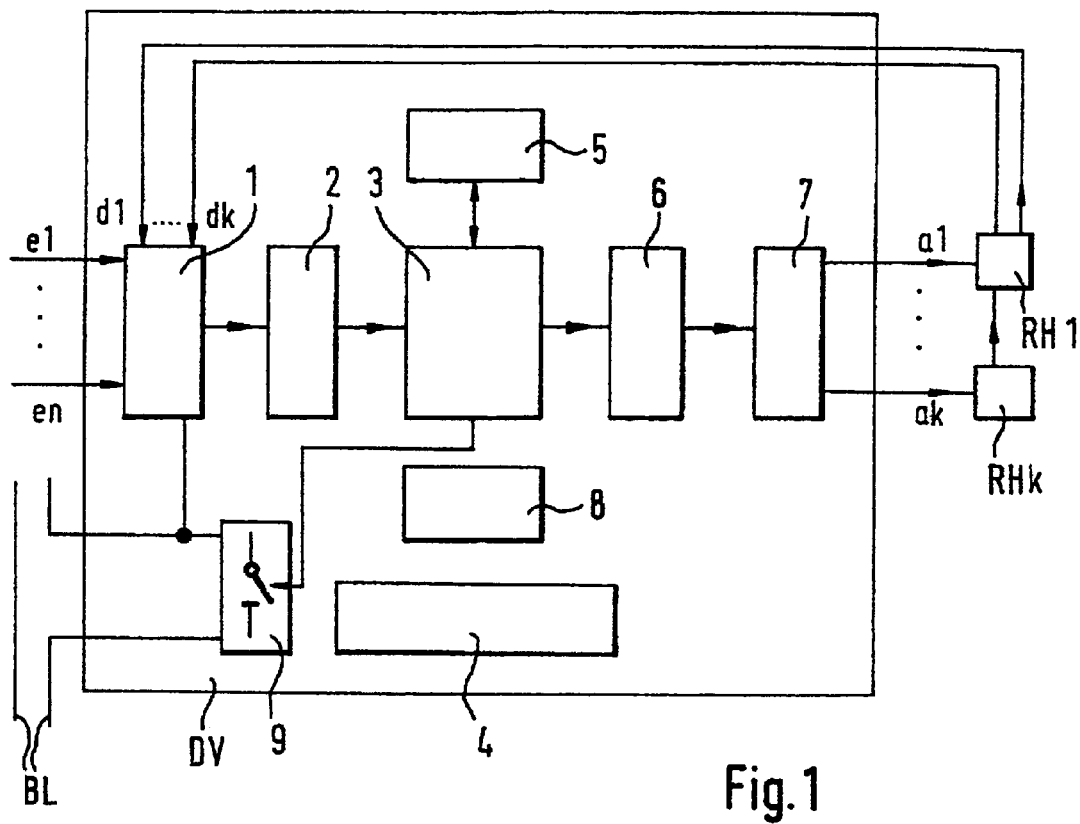
FIG. 1 shows a block diagram of a data processing unit.

FIG. 1 shows a data processing unit DV which is provided for controlling one or more restraint devices in a vehicle. In the embodiment shown here, a plurality of restraint devices RH1 through RHk are connected to data processing unit DV. This group of k restraint devices RH1 through RHk is preferably assigned to one occupant of the vehicle. If this is the front passenger, for example, restraint devices RH1 through RHk might include a front airbag, one or two side airbags in the head or chest area, a knee bag and a seat belt tensioner, in which case all the airbags and the seat belt tensioner may also be deployed in multiple stages. For each of these restraint devices, data processing unit DV generates a deployment signal a1 through ak in the event of a crash, the choice of which restraint devices to deploy and the deployment times being made on the basis of multiple input signals e1 through en. Input signals e1 through en come from sensors, for example, which may include one or more acceleration sensors to detect the kinetic behavior of the vehicle in a crash, precrash sensors, a seat belt lock sensor and seat occupancy sensors. Data processing unit DV determines from seat occupancy sensor signals whether the front passenger seat is occupied at all, whether a child or an adult is sitting there and even the posture of the passenger, so that accordingly the only restraint devices deployed are those that can protect the occupant without injuring him or her. Likewise, deployment of restraint devices is suppressed entirely if there is no occupant in the passenger seat or if there is a child seat or baggage in that seat.

Unlike the related art, where analysis of the sensor signals takes place in a central control unit and deployment signals derived from this are transmitted over the bus system to the peripheral ignition power modules of the respective restraint devices, data processing unit DV operates autonomously for the restraint devices RH1 through RHk assigned to it and need not rely on centrally derived deployment information.

In FIG. 1, the individual function elements within data processing unit DV are indicated in the form of blocks. There is a signal input circuit 1 for receiving analog or digital input signals e1 through en. This signal input circuit 1 contains, for example, signal drivers and optionally a multiplexer for converting input signals applied in parallel to a serial data stream. An analog-digital conversion of analog input signals can take place in downstream data processing circuit 2; in each case the data is processed here so that it can be processed further digitally by a downstream processing unit 3. Processing unit 3 handles all control functions in data processing unit DV. For example, it determines from input signals e1 through en which of the connected restraint devices RH1 through RHk is to be deployed at which times. It also performs a diagnosis of the ignition elements in restraint devices RH1 through RHk. For this purpose, diagnostic signals d1 through dk, which may be the resistance values of the ignition elements, for example, are sent to signal input circuit 1. Processing unit 3 compares diagnostic signals d1 through dk with reference values and issues an error message whenever there is an unacceptable deviation. A diagnosis of the reserve power in a power supply part 4 is also performed. A memory unit 5 stores temporary data, such as resistance values of the ignition elements and power levels of the reserve power, etc.; likewise, technical manufacturing data and characteristics can be stored in memory unit 5. Processing unit 3 can access the data in memory unit 5 and can enter new data into the memory unit.

Accordingly, the input side of data processing unit DV is followed at the output by a data processing circuit 6 and a signal output circuit 7 after processing unit 3. For example, in data processing circuit 6, digital deployment information or diagnostic inquiry signals from processing unit 3 are converted into ignition currents or test currents for the ignition elements of restraint devices RH1 through RHk. Signal output circuit 7 is equipped with signal drivers and optionally a demultiplexer which divides a serial output signal data stream into individual parallel output signals a1 through ak.

A time and clock base 8 in data processing unit DV supplies all the function blocks with a uniform synchronous clock pulse.

The division of the function blocks shown in FIG. 1 is of course not obligatory. For example, signal input circuit 1 and data processing circuit 2 or signal output circuit 6 and data processing circuit 7 may be combined and even integrated into processing unit 3 to some extent. Likewise, power supply 4 and/or the time and clock base may be integrated into data processing circuits 2, 6. There are many possibilities here for combining multiple functions in one circuit element.

As stated previously, each data processing unit DV can control restraint devices RH1 through RHk assigned to it completely autonomously. However, all the data processing units can also be networked over a bus system, so that some functions in the data processing units can be controlled centrally by one or more control units. For example, synchronization of time and clock base 8 or initializing a diagnostic procedure of the deployment elements of the restraint devices can be controlled centrally, or the power in the individual data processing units could be supplied by the central control unit(s). If it is appropriate to suppress deployment of some or all of the restraint devices, a stop signal could be sent from a central control unit to the data processing units.

As shown in FIG. 1, data processing unit DV is equipped with a circuit breaker 9 by means of which downstream data processing units DV are connected to or disconnected from bus line BL in the case when it receives some control signals over a bus line BL. Circuit breaker 9 is controlled by processing unit 3. A request to close or open circuit breaker 9 can be transmitted from a central control unit over bus line BL. It is thus possible to address individual data processing units specifically and supply them with information or control signals.

Figure 2:
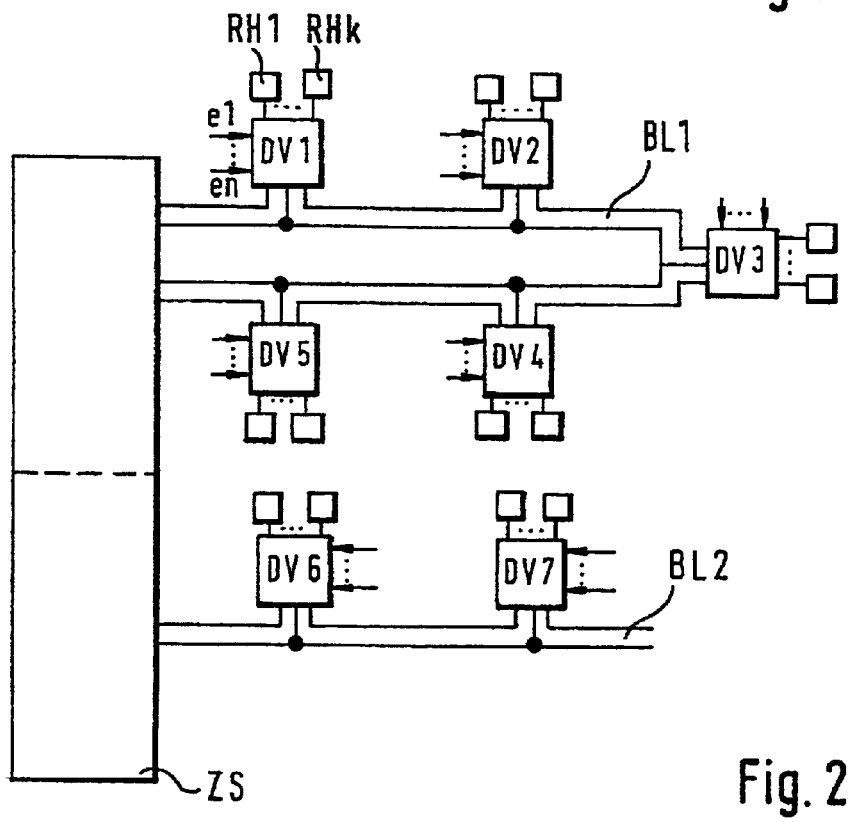
FIG. 2 shows a block diagram having a plurality of data processing units connected to different bus lines.

FIG. 2 shows a central control unit ZS having two different two-strand bus lines BL1 and BL2. The first bus line BL1 is a ring line to which are connected, for example, five data processing units DV1 through DV5. These data processing units are of the type shown in FIG. 1 and have signal inputs e1 through en for control signals and output signal connections for restraint devices RH1 through RHk in addition to connections for the bus line. Since this wiring is the same with all the data processing units, only data processing unit DV1 has been provided with reference numbers by way of an example. Ring line BL1 has the advantage that central control unit ZS can feed control signals into bus line BL1 from both sides, so that each data processing unit DV1 through DV5 can be driven even in the event of a short circuit or an interruption in the line. The second bus line BL2 is designed as a spur line to which are connected, for example, four data processing units DV6 and DV7 of the type described here.

Whereas FIG. 2 shows a single central control unit ZS for both bus line systems BL1 and BL2, a separate central control unit may also be provided for each bus line, as indicated here by the dotted line. Multiple control units may also be connected to each bus line, and one or more data processing units can assume this function of a central control unit. Moreover, to achieve a high level of standardization, it is appropriate to implement the central control unit(s) ZS with the same circuit structure as data processing units DV, DV1, . . . DV7.

As indicated in FIG. 2, it may be expedient under some circumstances to network groups of data processing units which are concentrated at certain locations in the vehicle over their own bus systems BL1, BL2.

What is claimed is:

1. A device for controlling restraint devices in a vehicle, comprising:
   a plurality of data processing units for controlling the restraint devices, wherein:
      each of the plurality of data processing units has a same design as each other, each of the plurality of data processing units includes:
 a processing unit,
 a signal input circuit,
 an output circuit,
 a time and clock base, and
 an arrangement for receiving a signal from a power supply, and
each one of the plurality of data processing units decides independently of each other whether at least one of the restraint devices assigned thereto is to be deployed.

2. The device according to claim 1, wherein:
multiple parallel input signals are sent to one of the plurality of data processing units, and
multiple output signals are generated by one of the plurality of data processing units as deployment signals for the restraint devices as a function of the input signals.

3. The device according to claim 1, wherein:
input signals to the plurality of data processing units originate from sensors.

4. The device according to claim 3, wherein:
the sensors include at least one of acceleration sensors, precrash sensors, seat occupancy sensors, and belt lock sensors.

5. The device according to claim 1, further comprising:
a bus line; and
at least one central control unit for controlling individual functions of the plurality of data processing units, wherein:
each one of the plurality of data processing units is connected over the bus line to the at least one central control unit.

6. The device according to claim 5, wherein:
the at least one central control unit has a structure that is the same as that of the plurality of data processing units.

7. The device according to claim 1, further comprising:
a plurality of bus lines; and
at least one central control unit for controlling individual functions of the plurality of data processing units, wherein:
 groups of the plurality of data processing units are connected over separate ones of the plurality of bus lines to the at least one central control unit.

8. The device according to claim 7, wherein:
the plurality of bus lines correspond to one of ring lines and spur lines.

9. The device according to claim 7, wherein:
the plurality of data processing units receive over the plurality of bus lines from the at least one central control unit at least one of the signal for the power supply, synchronization signals for the time and clock base, control signals for a circuit breaker, by which a respective one of the plurality of data processing units can one of connect and disconnect at least one of the plurality of bus lines, signals for initiating a diagnostic procedure of deployment elements of the restraint devices, and a stop signal that suppresses a deployment of the restraint devices.

10. The device according to claim 7, wherein:
the at least one central control unit has a structure that is the same as that of the plurality of data processing units.

* * * * *

UNITED STATES PATENT AND TRADEMARK OFFICE
CERTIFICATE OF CORRECTION

| | | |
|---|---|---|
| PATENT NO. | : 6,901,321 B1 | Page 1 of 1 |
| APPLICATION NO. | : 09/647296 | |
| DATED | : May 31, 2005 | |
| INVENTOR(S) | : Werner Nitschke et al. | |

It is certified that error appears in the above-identified patent and that said Letters Patent is hereby corrected as shown below:

Column 1,
Line 15, change "respective deployment device" to -- respective deployment devices --.
Lines 28-29, change "für R" to -- für --.
Line 28-29, change "üchhaltesysteme" to -- Rückhaltsysteme --.

Column 3,
Line 35, change "unit 3. Processing unit 3" to -- unit 3. --.
Line 35, insert -- Processing unit 3… -- as new paragraph.

Signed and Sealed this

Eleventh Day of July, 2006

JON W. DUDAS
*Director of the United States Patent and Trademark Office*